United States Patent
Booth et al.

(10) Patent No.: US 9,342,892 B2
(45) Date of Patent: May 17, 2016

(54) IMAGE BINARIZATION

(71) Applicant: Lexmark International, Inc., Lexington, KY (US)

(72) Inventors: Robert Reed Booth, Lexington, KY (US); Michael Jo Phelps, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 43 days.

(21) Appl. No.: 14/200,551

(22) Filed: Mar. 7, 2014

(65) Prior Publication Data
US 2015/0254865 A1   Sep. 10, 2015

(51) Int. Cl.
  *G06T 7/00*   (2006.01)
  *G06T 5/40*   (2006.01)
  *G06T 5/00*   (2006.01)

(52) U.S. Cl.
  CPC .............. *G06T 7/0081* (2013.01); *G06T 5/002* (2013.01); *G06T 5/40* (2013.01)

(58) Field of Classification Search
  USPC ......... 382/237, 176, 212, 205, 218, 278, 254, 382/209, 286, 141, 304; 348/222.1, 333.04; 358/1.9, 3.08, 448, 461, 465, 500
  See application file for complete search history.

(56) References Cited

U.S. PATENT DOCUMENTS

| | | | | |
|---|---|---|---|---|
| 5,268,771 | A | * | 12/1993 | Murakami et al. ............ 358/448 |
| 5,583,950 | A | * | 12/1996 | Prokoski ....................... 382/212 |
| 5,838,463 | A | * | 11/1998 | Gahang ......................... 358/465 |
| 7,623,727 | B2 | | 11/2009 | Takahashi |
| 7,636,467 | B2 | | 12/2009 | Burian |
| 8,351,720 | B2 | | 1/2013 | Majewicz |
| 8,406,554 | B1 | | 3/2013 | Saha |

OTHER PUBLICATIONS

Su Bolan, Lu Shijian, Tan Chew Lim; Document Image Binarization; publication; National University of Singapore; 4 ppg; Singapore, Jan. 13, 2014.

* cited by examiner

*Primary Examiner* — Anh Do

(57) ABSTRACT

Systems and methods convert to binary an input image having pixels defining text and background. Thresholds are determined by which pixels in the input image and a corresponding blurred image will be defined as either binary black or binary white. Thresholds derive from grouped together neighboring pixels having pixels separated out that correspond to the background. For pixels of the input image defined as binary black and having corresponding pixels in the blurred image defined as binary black relative to their thresholds, those are set to black in the binary image, else they are set white. Techniques for devising thresholds, blurring images, grouping together pixels, statistical analysis, etc., typify the embodiments.

22 Claims, 17 Drawing Sheets
(6 of 17 Drawing Sheet(s) Filed in Color)

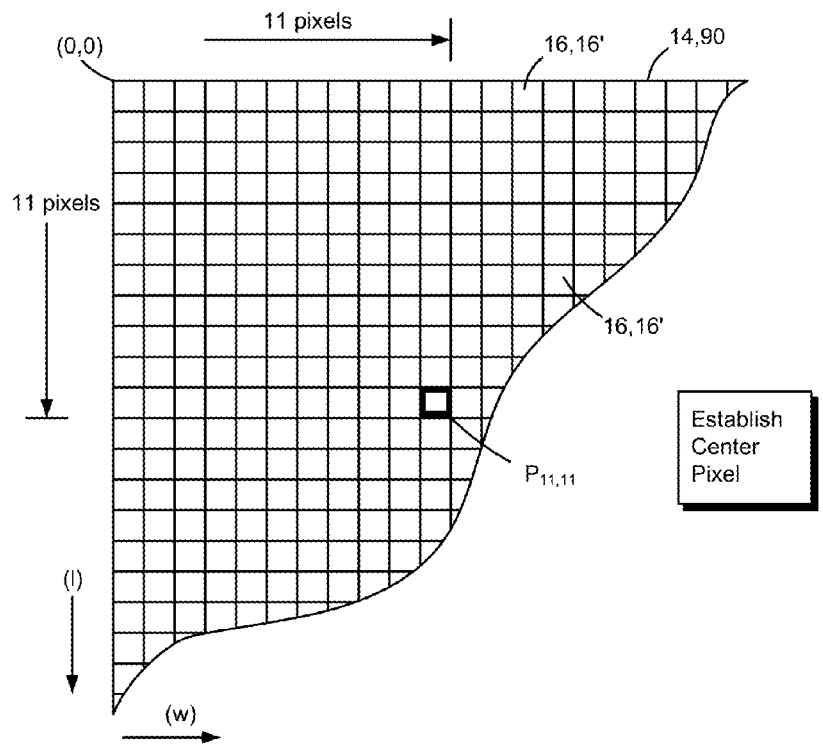
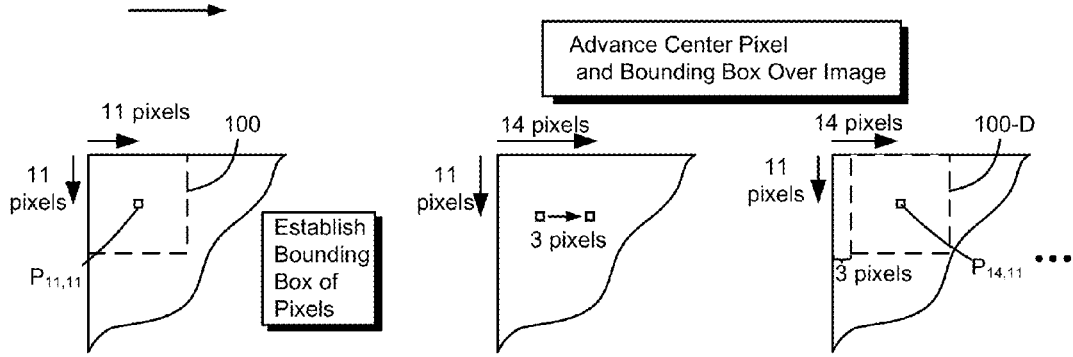
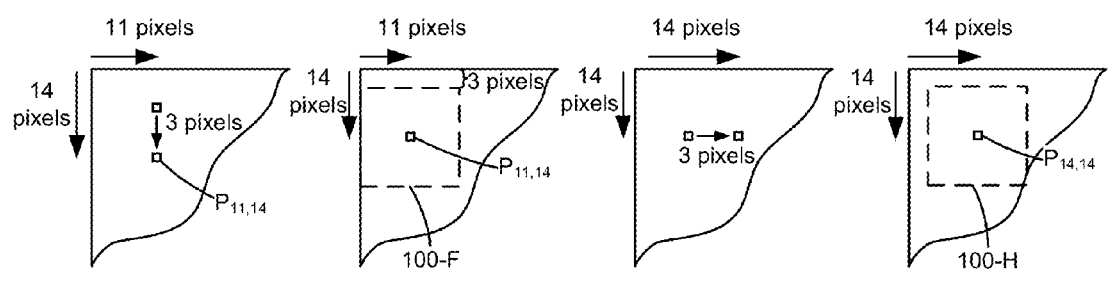

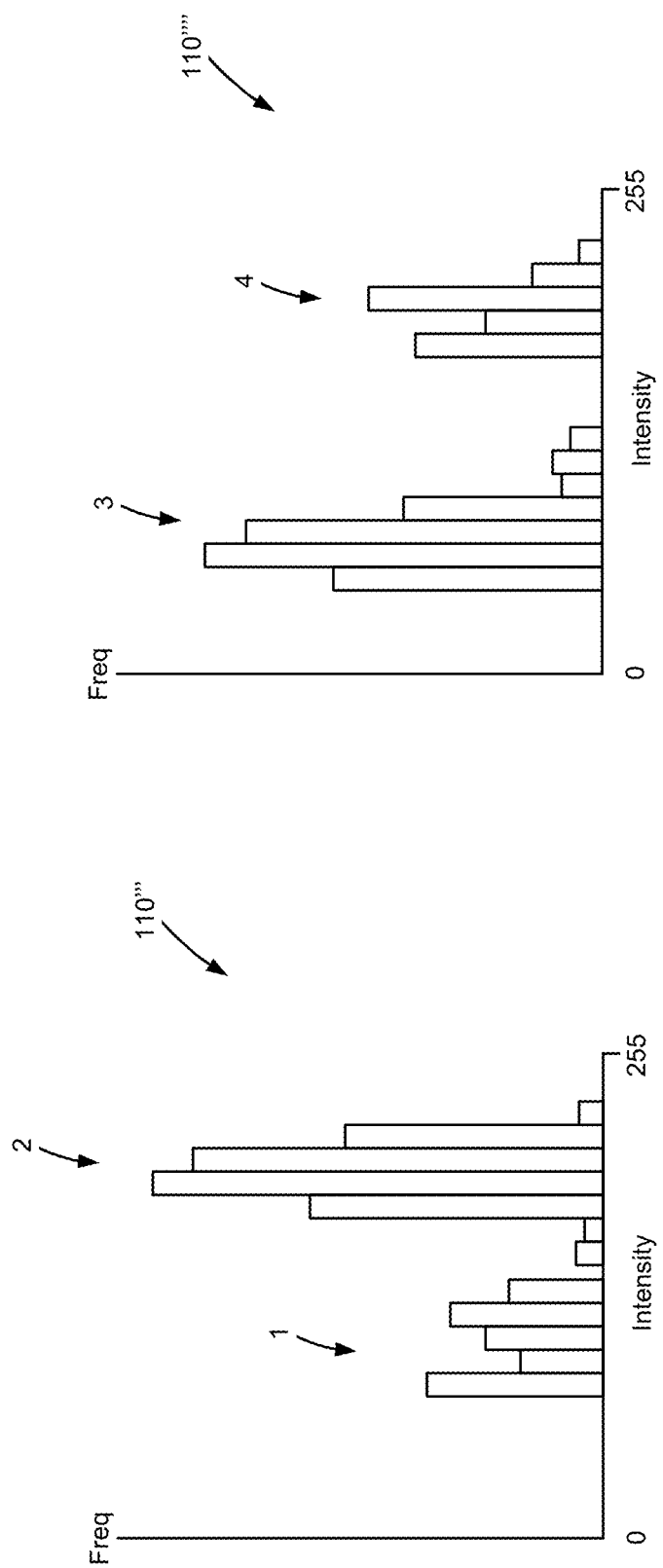

Histogram Bin Count

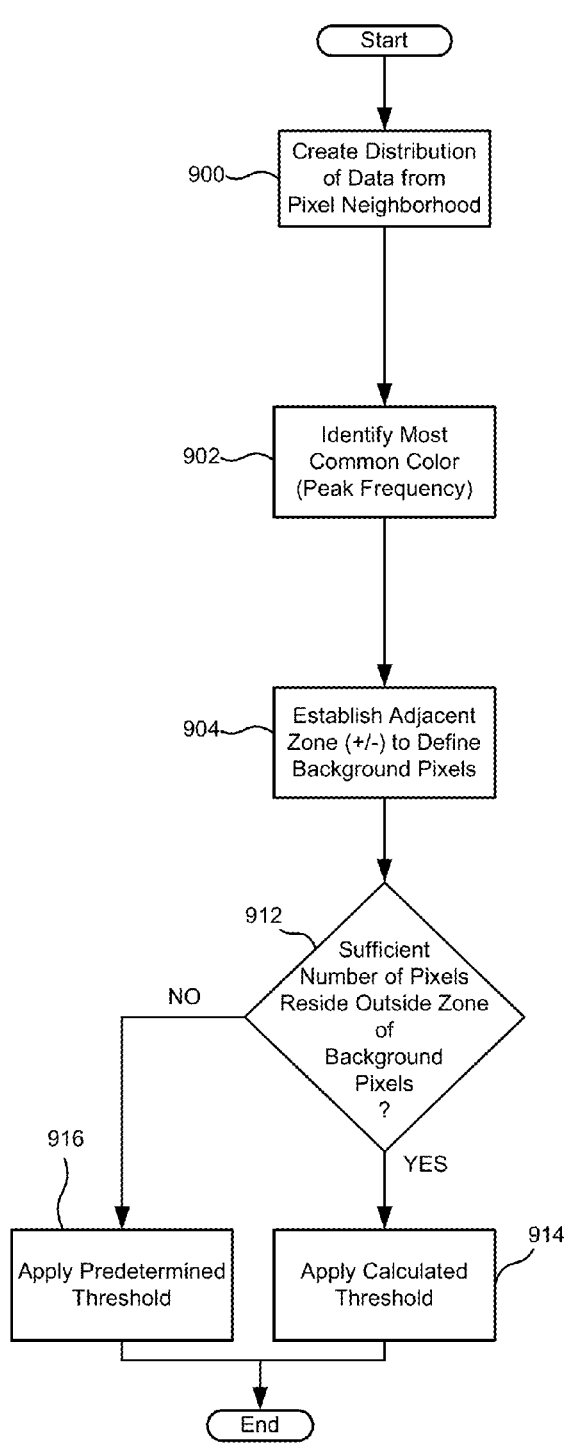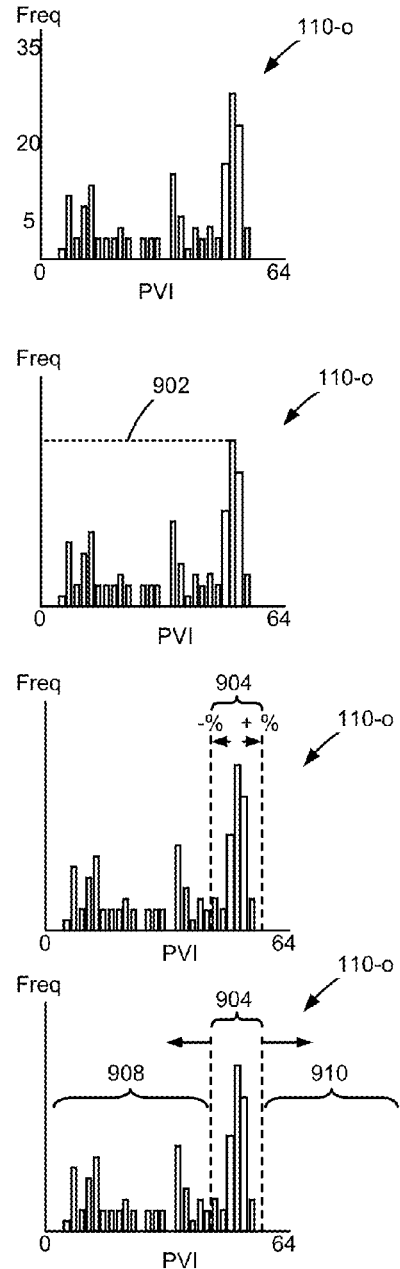
FIG. 9

FIG. 13
(Original)

FIG. 15
(Application of Instant Techniques)

IMAGE BINARIZATION

FIELD OF THE EMBODIMENTS

The present disclosure relates to converting grayscale, color or other multi-valued images into binary representations (binarization). It relates further to conversion based on neighborhoods of local pixels, rather than global conversion applied to entireties of images. Operating on blurred and non-blurred representations of the input image typifies the embodiments.

BACKGROUND

In traditional optical character recognition (OCR) environments 5, FIG. 1, a hard copy document 10 becomes digitized for computing actions, such as electronic editing, searching, storing compactly, displaying on monitors, etc. It is also digitized as a precursor to other routines, such as machine translation, data extraction, text mining, invoice processing, invoice payment, and the like. As is typical, the hard copy document is any of a variety, but is commonly an invoice, bank statement, receipt, business card, written paper, book, etc. It contains both text 7 and background 9. The text typifies words, numbers, symbols, phrases, etc. having content relating to the topic of the hard copy 10. The background, on the other hand, represents the underlying media on which the content appears. The background can also include various colors, advertisements, corporate logos, watermarks, texture, creases, speckles, stray marks, and the like.

The document 10 becomes scanned 12 which results in a grayscale or color image 14 defined by pixels. The pixels 16-1, 16-2, 16-3 . . . are many and range in volume depending upon the resolution of the scan, e.g., 150 dpi, 300 dpi, etc. Each pixel has an intensity value defined according to various scales, but a range of 256 possible values is common, e.g., 0-255. Upon binarization 20, the intensity values get converted from 0-255 to one of two possible binary values (black or white) in a binary image 22. Scanned pixel 16-3 in image 14 becomes binarized pixel 16-3' in binary image 22 with a value of black or white, 1 or 0. In many schemes, binarization occurs by splitting in half the intensity scale of the pixels and labeling as black pixels those with relatively dark intensities and white pixels those with light intensities. At graph 25, for instance, pixels 16 of input image 14 having intensities ranging from 0-127 become labeled black during traditional binarization, while those with intensities from 128-255 become labeled white.

The result of binarization serves as input to OCR 30, which creates an output of content 40 available for further processing, storage, searching, text mining, displaying, etc. Text 41, XML 43, searchable .pdf's 45, and the like, are common types of OCR outputs. The process also often takes place through instructions, software, etc. executing on controller(s) in hardware 50, such as imaging devices e.g. multi-function printers (MFPs), all-in-ones (AIOs), copier machines, etc. Of course, not all OCR engines utilize binarization techniques. Instead, some directly take as input to their engine the grayscale or color image output from the scanning function.

Regardless of approach, the data submitted to OCR algorithms does not identify or help specify text characters or other content of the original document. Binarization is also susceptible to losing important information in low contrast regions of documents, especially where light text resides on light backgrounds or dark text resides on dark backgrounds. If a dark text pixel, say an intensity 50 of 255 (graph 25), resides nearby dark background pixels, say intensity 75 of 255, application of a global threshold of e.g. 50% results in both text and background pixels being characterized as black after binarization. That the text and backgrounds are similar in color, all text information is lost after binarization. As seen in FIG. 2, a group of pixels 60 from document 10' have both dark text pixels 7' (from a portion of the letter "N") and dark background pixels 9'. If a global threshold of 50% is used to binarize this image, all pixels are homogeneously declared the same binary value, black 60', as they all reside less than the threshold. Informational content is lost between the original text 7' and background 9'. Similarly, informational content is lost when light text pixels or dot-matrix style pixels reside on light colored backgrounds. Traditional binarization techniques simply do not allow dark and light text to be discerned clearly enough when positioned on/nearby dark and light background regions within the same image.

What is needed is better binarization. What is further needed is better discernment of light and dark text from light and dark backgrounds to avoid loss of content. Further needs also contemplate instructions or software executable on controller(s) in hardware, such as imaging devices. Additional benefits and alternatives are sought when devising solutions.

SUMMARY

The above-mentioned and other problems are solved by methods and apparatus for improved image binarization. Techniques include conversion of grayscale and color images in a manner that maximizes accuracy of optical character recognition (OCR). Rather than applying a single threshold to an entire image for binarization, custom thresholds are selected for pixels in an image based on surrounding pixels. Algorithms first apply a blurring operation to a window of neighboring pixels surrounding each pixel to smooth out halftone backgrounds. Next, a down-sampled distribution of data of the blurred window is calculated, e.g., histogram, to identify a most popular grayscale/color value of the image. If most of the blurred pixels are similar in color to the most popular color, the algorithm assumes that a center pixel in the window comprises part of a uniform region of color and a predetermined threshold is applied by which the centering pixel is either defined as a black or white binary pixel. On the other hand, if a significant number of pixels in the blurred window are statistically different than the most popular color, the algorithm assumes the region is not a uniform color. If more pixels are darker than the most popular color, a threshold is selected to maximize the separation between the most popular color and the average of the dark pixels. The algorithm also applies similar logic if more pixels are lighter than the most popular color. Pixels in both the blurred image and the original image must be darker than their thresholds in order for a black pixel to be set in the binary image. The technique makes it possible to remove uniform backgrounds and halftones, without sacrificing details of small fonts, and reduce OCR processing time.

In a representative design, systems and methods convert to binary an input image having pixels defining text and background. Upon blurring the image, thresholds are determined by which pixels are defined as either binary black or binary white. Thresholds derive from grouped together neighboring pixels having pixels separated out that correspond to the background. For pixels of the input image defined as binary black and having corresponding pixels in the blurred image defined as binary black relative to their thresholds, those are set to black in the binary image, else they are set white.

Techniques for devising thresholds, blurring images, grouping together pixels, statistical analysis, etc., typify the embodiments.

These and other embodiments are set forth in the description below. Their advantages and features will become readily apparent to skilled artisans. The claims set forth particular limitations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4H are diagrammatic views showing pixel and bounding box terminology and movement according to the present invention;

FIGS. 6A-6D are diagrammatic views of common histograms according to the present invention;

FIG. 9 is a flow chart and accompanying diagrams for applying a threshold for deciding binary quantification according to the distribution of data in a histogram;

FIG. 13 is a diagrammatic view of a representative input document;

FIG. 15 is a diagrammatic view of the input document of FIG. 13 after binarization according to the present invention standing in crisp contrast to the results of the prior art in FIG. 14.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach improved image binarization.

Figure 1:
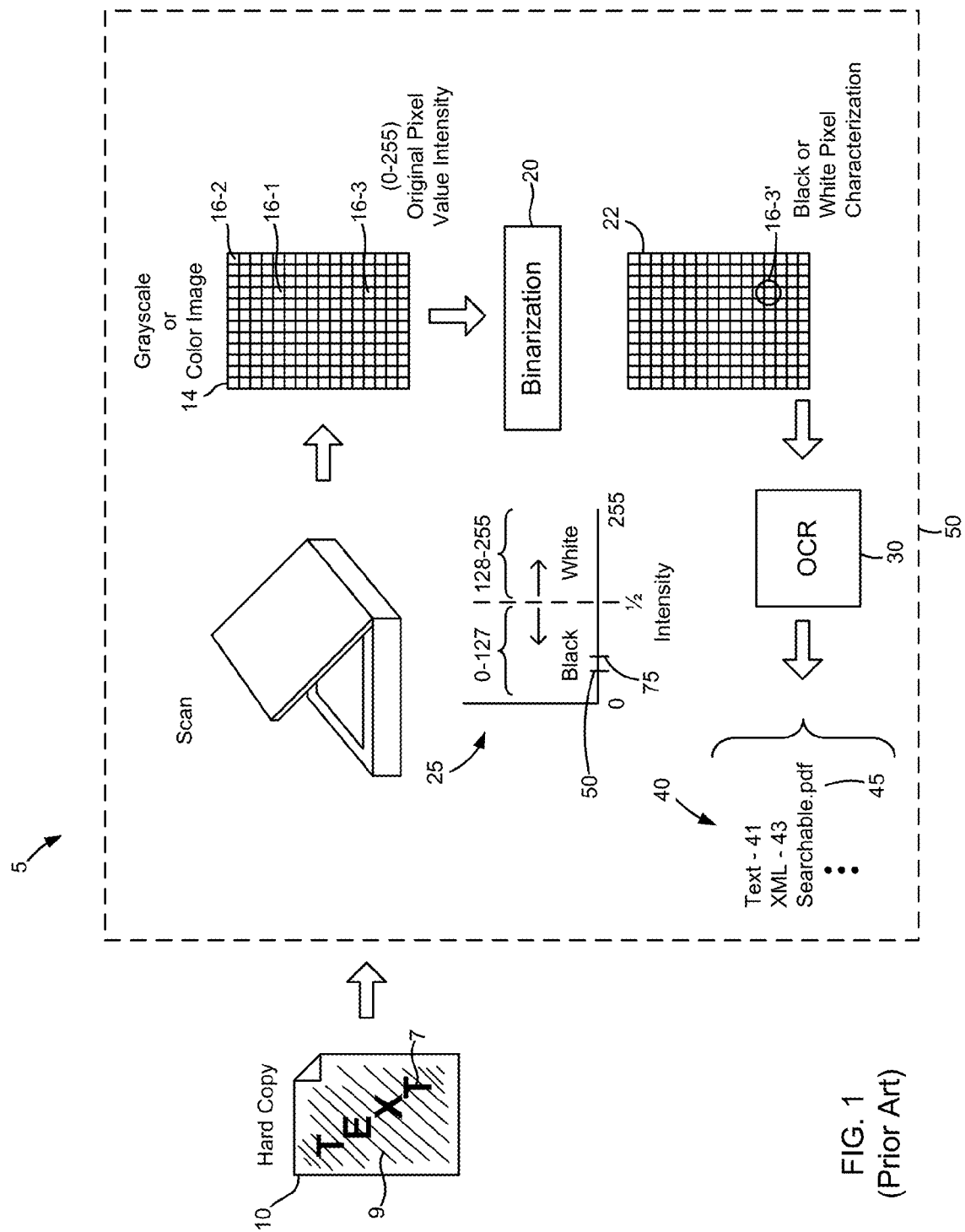
FIG. 1 is a diagrammatic view of an OCR environment according to the prior art.
Figure 2:
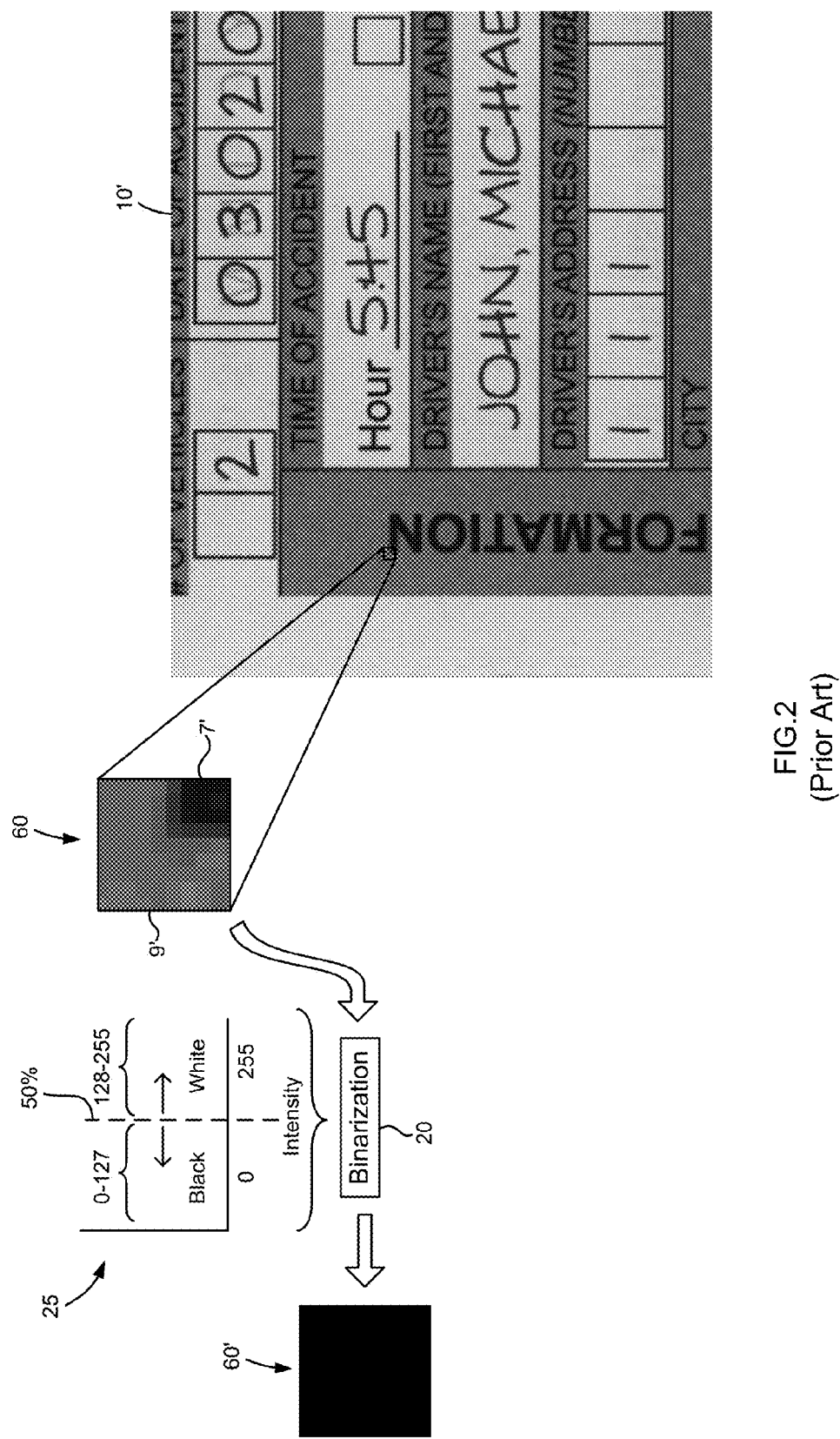
FIG. 2 is a diagrammatic view of poor binarization results according to techniques of the prior art.

With reference to FIG. 1, a grayscale, color or other multi-valued image 14 results from a scanning operation at 12. Individual pixels 16 of the image have pixels that define text and background according to pixel value intensities ranging from 0-255, typically. Binarization according to the present invention now provides better binary images 22 that serve as input to OCR engines, especially for use in imaging devices 50.

Figure 3:
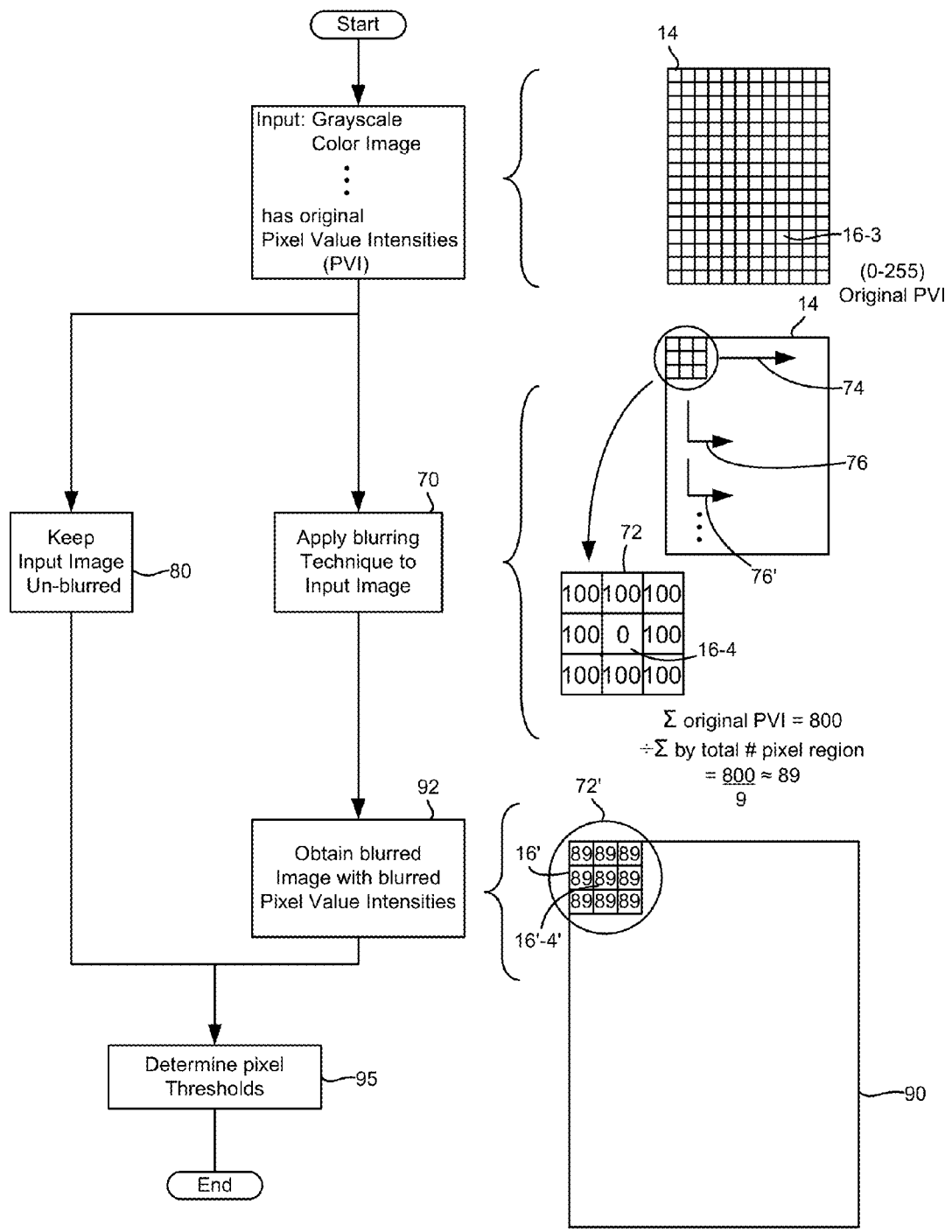
FIG. 3 is a flow chart according to the present invention for creating blurred images from non-blurred originals.

With reference to FIG. 3, the input image 14 is both blurred 70 and kept original or un-blurred 80. For blurring, one technique groups together a window or small groups of neighboring pixels 72 and converts pixel value intensities (PVI) to blurred pixel value intensities for the same region 72'. The window 72 is then advanced across 74 a width of the input image 14, then down and across 76, 76', with the process repeating as many times as necessary until a fully blurred image 90 is obtained at 92. The blurred image has pixels defining blurred text and blurred background corresponding to the input image. To actually obtain blurred from original pixel value intensities, light and dark pixels are blended with one another in small neighborhoods such that darker pixels become lighter while lighter pixels become darker. By sharing pixel value intensities in this way, each pixel in the blurred image becomes a composite of itself and its surrounding neighbors and noise is removed in the original, especially halftone backgrounds that are effectively converted into uniform backgrounds. Many techniques are known for doing this, but a representative technique includes a normalized box filter where each blurred pixel is a mean of its neighbors in the window, each contributing with equal weight.

At 78, pixel value intensities of the original image are summed. They are then divided by the total number of pixels in the region. In a square window 72 of 3×3 pixels, or nine total pixels, pixel value intensities of 100 are noted for all pixels, except for a center pixel 16-4 having a pixel value intensity of 0. Summing them together results in 800 which is then divided by nine pixels, or 800/9. The result is 88.88, or 89, when rounded to a next closest whole number. In the corresponding window 72' in the blurred image 90, each pixel has blurred pixels 16' with blurred pixel value intensities of 89 for an entirety of the window. It can be said that lighter pixel value intensities of the pixels of the input image have changed relatively dark (e.g., 100 PVIs in the original image 14 become 89 PVIs in the blurred image 90), while darker pixel value intensities of the pixels of the input image have changed relatively light (e.g., 0 PVI in the original image 14 becomes 89 PVI in the blurred image 90). Of course, other schemes are possible for blurring to remove halftones and noise. Regardless of approach, however, the original image 80 and blurred image 90 now proceed to having thresholds determined 95. Pixels of the original image and corresponding pixels in the blurred image become defined as either black or white binary representations, instead of being defined with multi-valued intensities.

Figure 5A:
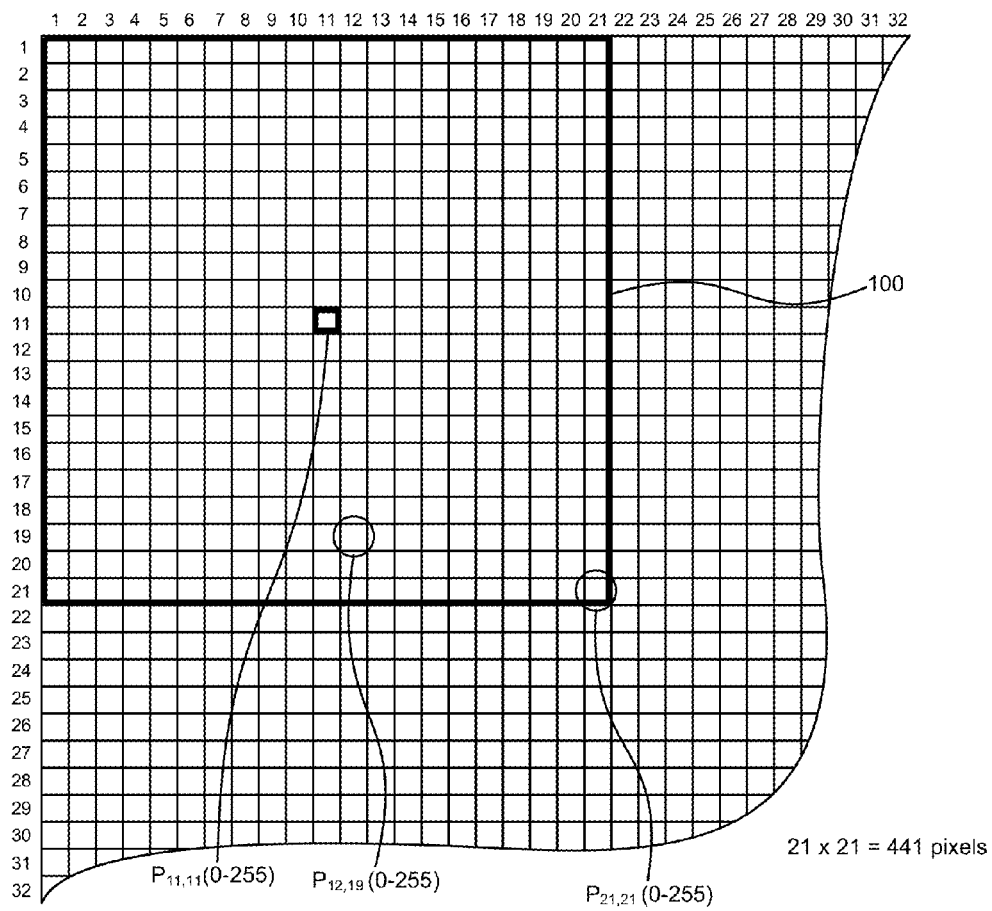
FIGS. 5A and 5B are diagrammatic views of a bounding box and corresponding distribution of data in the form of a histogram according to the present invention.

With reference to FIG. 4A, an image 14, 90 has pluralities of pixels 16, 16' defining a width (w) and length (l). As referenced as an x-y grid of pixels beginning at (0,0), a first center pixel of a bounding box is established. In this instance, pixel $P_{11,11}$ resides at 11 pixels across the width of the image and 11 pixels down the length of the image. In FIG. 4B, a bounding box 100 of grouped together pixels surrounds the center pixel $P_{11,11}$. As the bounding box 100 is representatively square about the center pixel, the box defines a 21×21 group of pixels neighboring one another for a total of 441 pixels as seen in FIG. 5A. Each pixel has a pixel value intensity ranging from 0-255 noted at pixels $P_{11,11}$, $P_{12,19}$ and $P_{21,21}$. A threshold is determined that will binarize these intensities as either a binary black or binary white for a given pixel under consideration, e.g., the center pixel $P_{11,11}$.

Figure 5B:
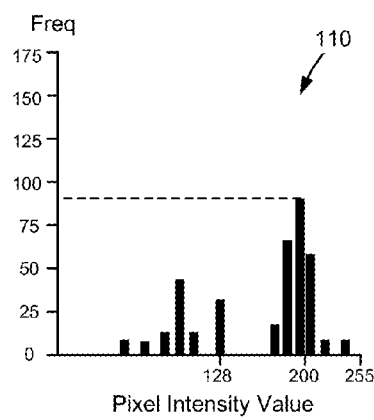
Figure 6A:
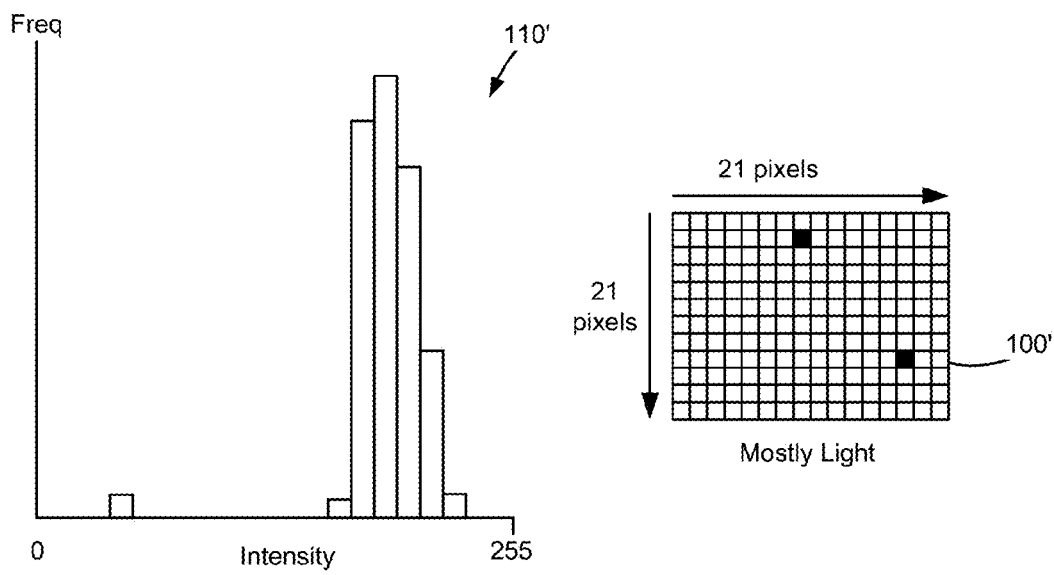
Figure 6B:
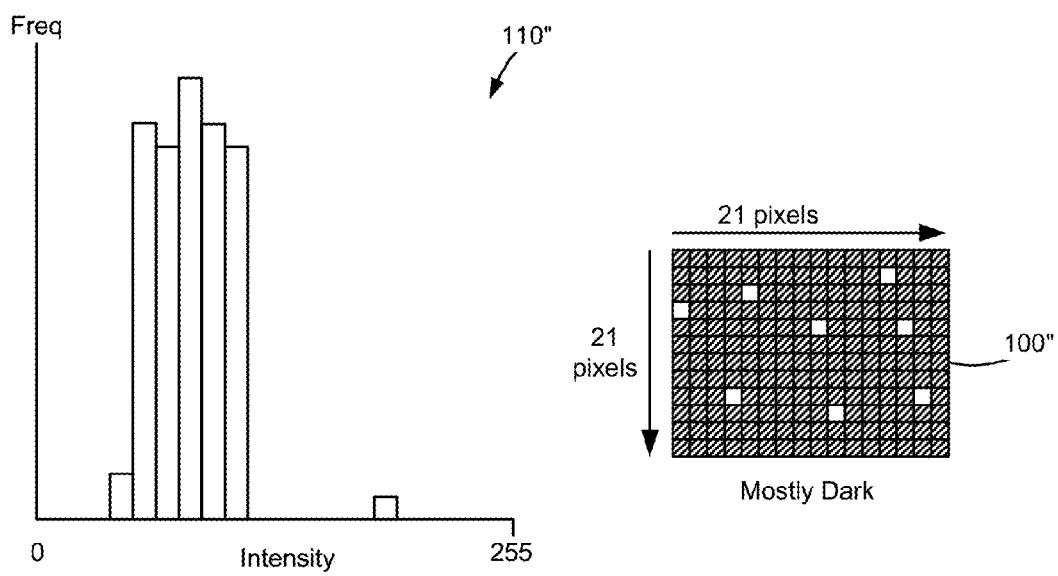

With reference to FIG. 5B, a distribution of data is devised that characterizes the pixel value intensities of the pixels in the bounding box. The distribution is selected as a histogram 110 having equal-sized bins along the x-axis, ranging 0-255, that correspond to the pixel value intensities of the pixels in the bounding box. Along the y-axis, the histogram defines a frequency of occurrence for each of the pixels in the bins. Pixels are lighter when their pixel value intensities range closer to value 255, while they are darker when their pixel value intensities range closer to value 0. Also, pixels having the highest frequency are known to represent the most popular color in the bounding box and correspond to the background of the image, rather than text. As noted by comparing FIGS. 6A and 6B, bounding boxes 100' of mostly white pixels have histograms 110' with highest-frequently occurring pixels residing closer to value 255, whereas bounding boxes 100" of mostly dark pixels have histograms 110" with highest-frequently occurring pixels residing closer to value 0. Of course, there may be bounding boxes of pixels of various shades representing both text and background in FIGS. 6C and 6D having multiple relative peaks of pixel value intensities 1, 2, 3, 4, such as in histograms 110''' and 110''''. Of course, still other histogram shapes, peaks, trends, etc. exist for a given set of neighboring pixels in bounding boxes, as are other distributions of data. Similarly, there are other ways to represent the data of the pixels in the histogram.

Figure 7A:
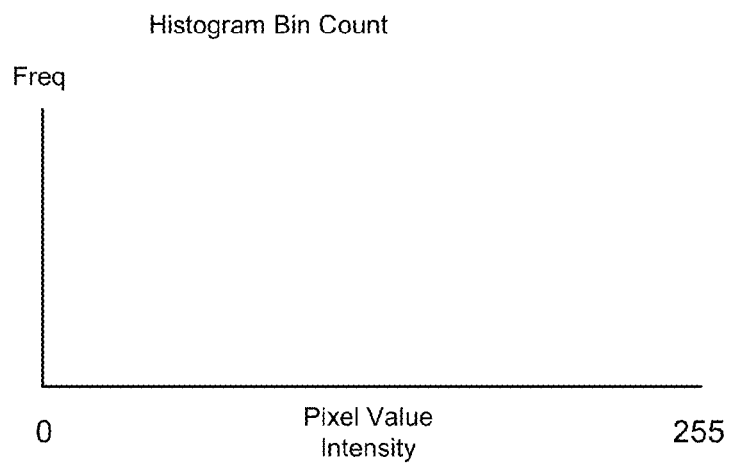
FIGS. 7A-7E are diagrammatic views of histograms with various bin counts according to the present invention.
Figure 7B:
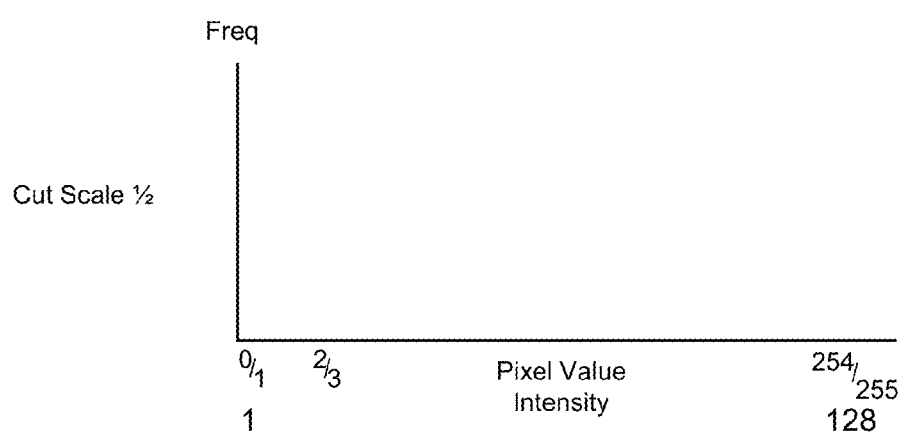
Figure 7C:
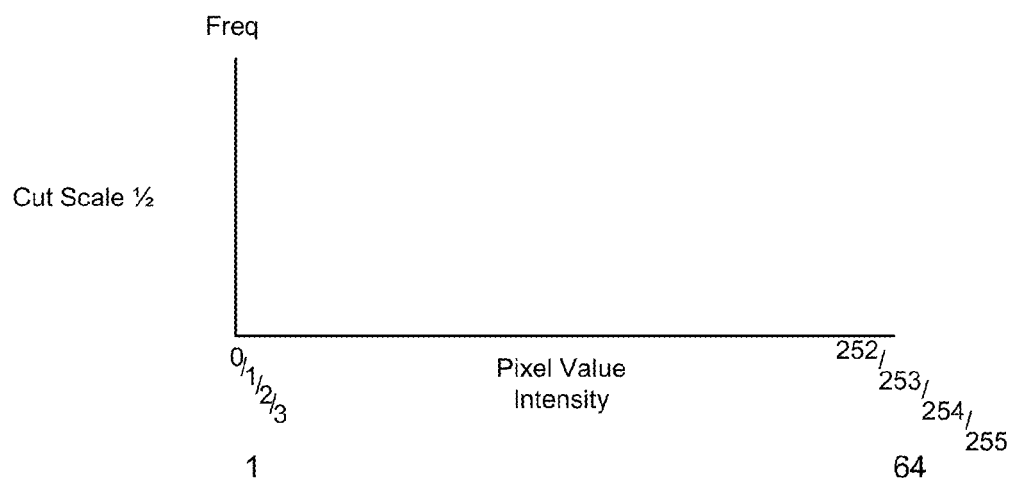
Figure 7D:
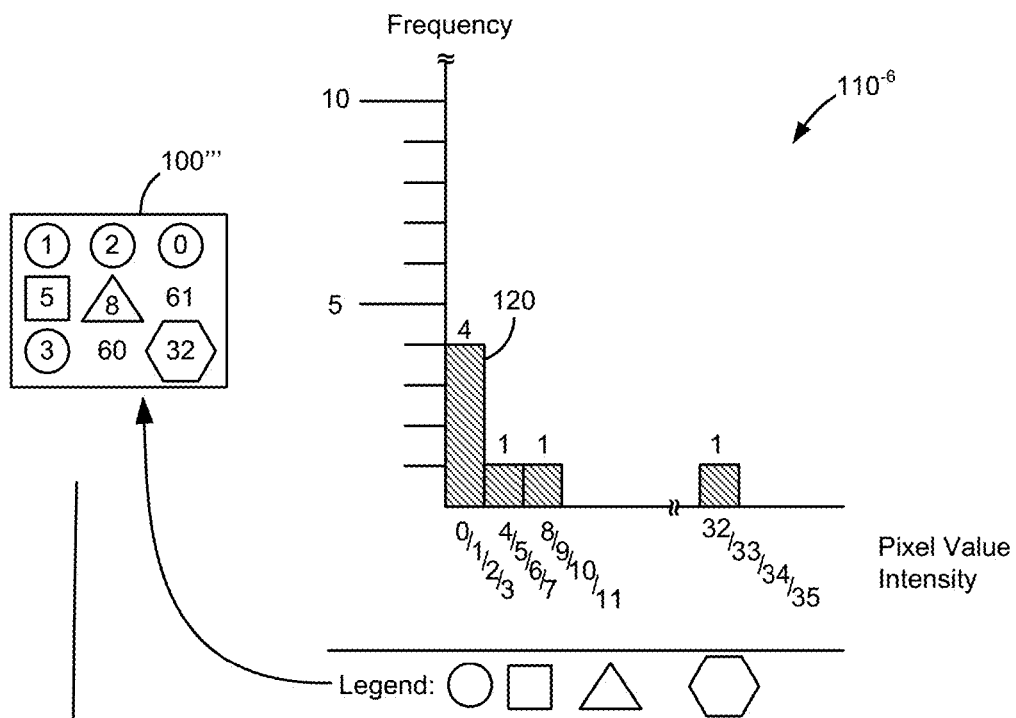
Figure 7E:
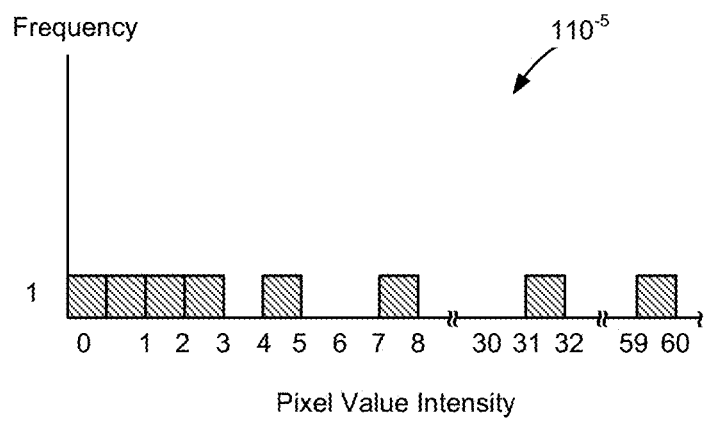

As noted in FIGS. 7A-7C, the x-axis can be cut in half scale in FIG. 7B, from FIG. 7A, and half again in FIG. 7C. In this way the bin count of pixel value intensities along the x-axis can be reduced from 256 (FIG. 7A) to 128 (FIG. 7B) to 64 (FIG. 7C). This reduces the amount of noise or anomalies in the bounding boxes and provides more meaningful pictures of data. As illustrated in FIG. 7D, a bounding box 100''' includes grouped together neighboring pixels having pixel value intensities of 1, 2, 0, 5, 8, 61, 3, 60 and 32 in a 3×3 square box of pixels. As no two intensities equal one another, a histogram $110^{-5}$ in FIG. 7E spread amongst 256 bins reveals a frequency count of one (1) for all of the pixels in the bounding box 100'''. In FIG. 7D, in contrast, the histogram $110^{-6}$ groups together bins 0-3, in a first bin, 4-7 in a next bin, 8-11, in still a next bin, and so on. As there are four pixels having intensities from 0-3, they are noted as the most common color 120 thus, revealing better data from the bounding box 100'''.

With reference back to FIGS. 4A-4H, skilled artisans will appreciate the foregoing describes a bounding box of grouped together pixels and distributions of data for only a limited group of pixels in an image having many more thousands of pixels. As such, a next bounding box of grouped together pixels needs to occur for another pixel under consideration relative to a local neighborhood of pixels surrounding it. This must also repeat until an entirety of pixels has been grouped together at least once in an image. With reference to FIGS. 4C-4D, a next bounding box occurs in an image 14, 90 by advancing the box and center pixel of FIG. 4B across an entirety of the image. The original center pixel $P_{11,11}$ first advances three pixels to the right across the width of the image to become pixel $P_{14,11}$ and the bounding box 100-D follows to keep the pixel centered. The process repeats until an entire width of the image has been grouped together.

In FIG. 4E, the centering pixel is thence advanced back to the starting side of the image and moved three pixels down the length to become pixel $P_{11,14}$. The bounding box 100-F follows in FIG. 4F and keeps the pixel centered. Similarly, FIG. 4G shows an advancing center pixel again moving three pixels to the right of its last position across the width of the image to become pixel $P_{14,14}$ and the bounding box 100-H follows to keep centered the pixel in FIG. 4H. The process repeats widthwise and then lengthwise for as often as necessary until an entirety of the image has been grouped together. Of course, the bounding box can be of various sizes/shapes and programmable as well. From experimentation, bounding boxes of 9×9 squares of 81 total pixels in an image scanned under 300×300 dpi resolution are decent alternatively-sized boxes to the foregoing. Boxes of 11×11 squares of 121 total pixels are also useful.

Figure 8:
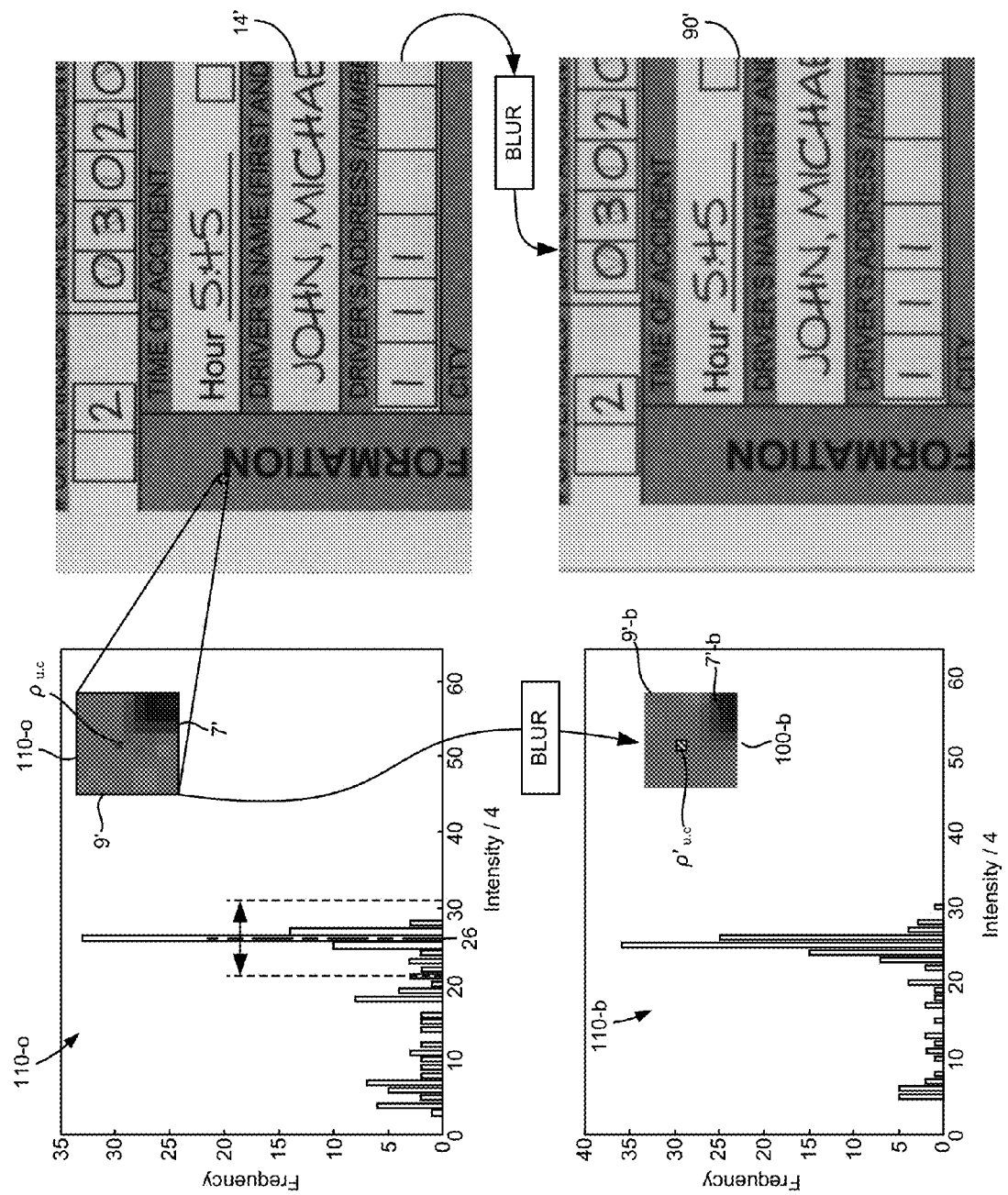
FIG. 8 is a diagrammatic view of a sample bounding box of pixels of an input image having histograms for blurred and non-blurred images thereof.

With reference to FIG. 8, a sample portion of an original image is given at 14' as is its corresponding blurred image at 90'. A grouped together bounding box of pixels 100-o has both background 9' and text 7'. Its blurred counterpart 100-b has blurred background 9'-b and blurred text 7'-b. Histograms 110-o, 110-b are devised for the boxes and correspond to the original (o) and blurred (b) images, respectively. Thresholds are now determined for pixels under consideration $P_{u.c.}$ and $P'_{u.c.}$ in the original and blurred boxes according to the flow chart of FIG. 9.

At 900, a distribution of data, such as a histogram, is created for a group of neighboring pixels. From that distribution, a most common color is identified, 902, e.g., the pixel value intensity having the highest frequency of occurrence. Noting certain amounts of pixel value intensities exist that are comparable to the highest frequency of occurrence, a +/− zone of pixels adjacent the most common color is established at 904. This +/− zone corresponds to the many pixels in the bounding box that define the background pixels. The zone can be programmed to any size, but +/−12 (out of 256 bins) is a number presently used by the inventors. The inventors also add a further offset to this zone to ensure that the background pixels are adequately distinguished away from any content, such as text. If, at 912, a sufficient number of pixels remain 908, 910 in the histogram outside the region 904, then the bounding box of neighboring pixels is deemed to have content worthy of uniquely calculating a binarization threshold 914. Else, a predetermined threshold is applied to the pixels under consideration to define them as either binary black or binary white values. Applying the thresholds proceeds according to FIG. 11, however, FIG. 10 details the statistical manipulation of the histogram to obtain the calculated threshold for 914.

At 1000, the histogram 110-o has a most common color of frequency 33 (y-axis) identified as occurring at pixel value intensity 26 (x-axis). After applying the +/− zone of 12 out of 256 bins, or 3 (12/4) out of 64 bins, the pixels of pixel value intensity from the range 23 to 29 are noted as defining the background pixels in the bounding box 100-o. Of the pixels remaining outside this zone, the pixel value intensities and pixel counts are determined from the histogram, 1000. If fewer than 4 pixels are outside of the +/− zone, the bounding box is said to contain a uniform background and a fixed threshold. However, if more than 4 pixels are outside the +/− zone, the region is not uniform. If more pixels outside of the +/− zone are darker than the background, the background is considered to be light, and all pixels darker than the pixels in the +/− zone are considered to be non-background pixels. If, on the other hand, more pixels outside of the +/− zone are lighter than the background, the background is considered to be dark, and all pixels lighter than the pixels in the +/− zone are considered to be non-background pixels.

At 1004, a mathematical product is taken for the pixel value intensities times their frequency of occurrence. At 1008 the entirety of the products are summed (Σ Product), as are the pixel counts summed (Σ Pixel Count) 1012. By dividing the former by the latter (Σ Product/Σ Pixel Count), the average pixel intensity of the non-background pixels is obtained 1016. The threshold 1018 is found by taking the average of the peak value and the average intensity of the non-background pixels. If Σ733/Σ59=12.42, the average pixel intensity of non-background pixels 1016 is obtained in the histogram 110-*o* by rounding down 12.42 to the nearest whole number, e.g. average=12. The threshold 1018 is found by adding the average pixel intensity of non-background pixels (e.g., average=12) to the intensity of the most popular color (e.g., 26), which gives 12+26=38, and dividing the result by two, or 38/2=19. Similarly, a threshold is obtained for histogram 110-*b* for the blurred image (not shown). To apply these thresholds, reference is taken to FIG. 11.

At 1100, thresholds and pixel value intensities are adjusted to ensure they have equivalent scales. That is, if pixels were first noted on a scale of 256 possible intensity values, but the threshold was based on a histogram having only 64 bins, vice 256 bins, the threshold from the 64 bins needs to be converted back to the 256 intensity scale. Thus, a threshold of 12, From FIG. 10, becomes multiplied by four so that the threshold value is 48, or 12×4. After that, 1102, each pixel under consideration in either the blurred image (90) or original image (14) is compared to the appropriate threshold value. If the threshold is a predetermined threshold found at 916, FIG. 9, the pixel value intensity of the pixel in the image is compared to a programmable value. Upon experimentation, the threshold value of 80 (1103) has been found to delineate well the difference between setting a pixel to black binary or white binary. (A global threshold of 75 is still another useful threshold and used below in the sample code section of the disclosure.) It has been found that a relatively low static threshold, less than half the bin count, causes most uniform backgrounds to be converted to white pixels and detail is preserved for small fonts. If a pixel under consideration 1105 had a pixel value intensity of 210 as illustrated in a bounding box 110-11 of mostly white pixels, for example, the pixel under consideration would be no longer consider with an intensity of 210, but would be considered a white pixel as 210>80. Conversely, if the pixel value intensity were a value less than or equal to the 80 (not shown), the pixel under consideration would be considered binary black.

Figure 10:
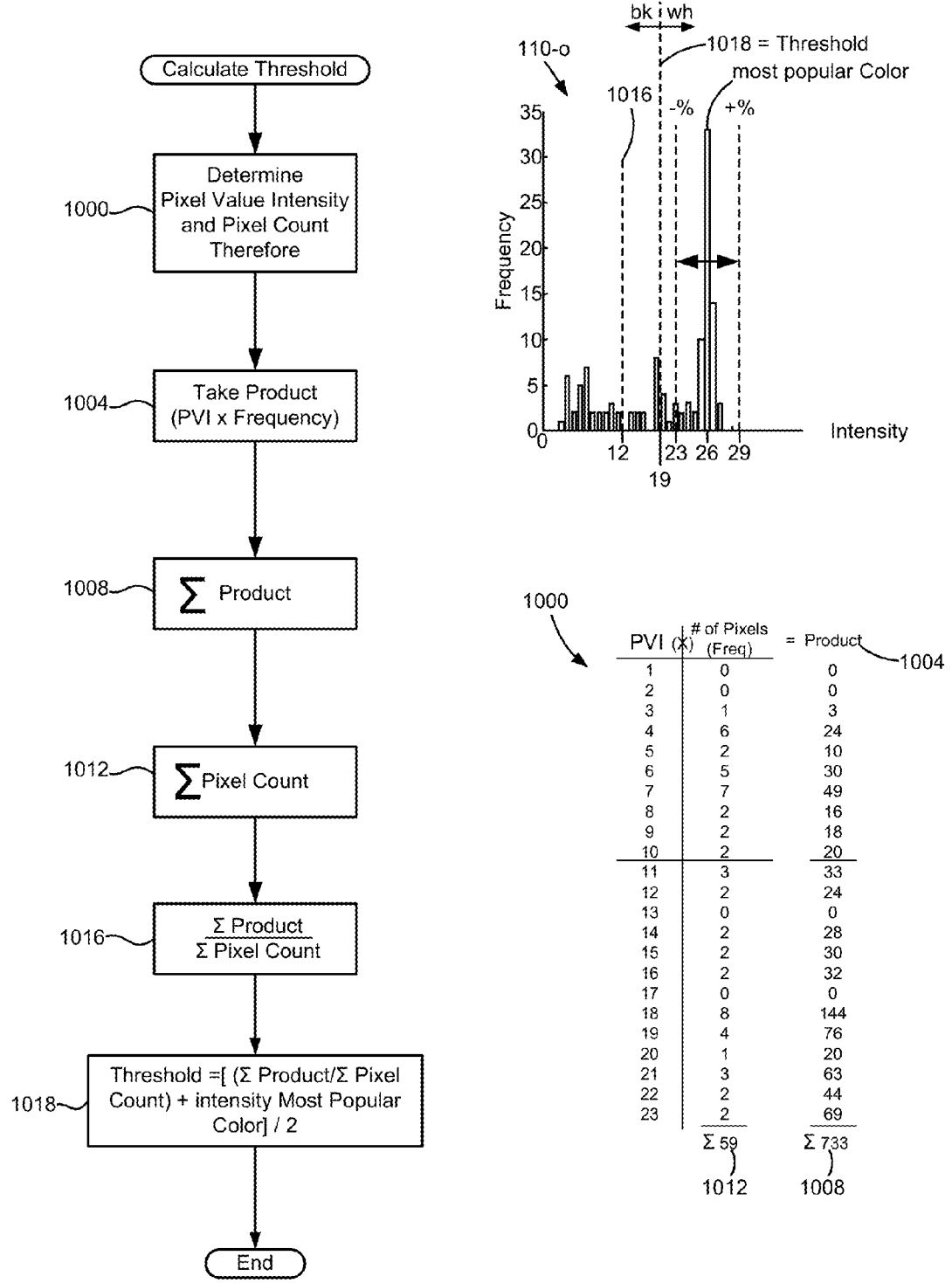
FIG. 10 is a flow chart and diagram for determining a unique threshold for a bounding box of grouped together neighboring pixels.
Figure 11:
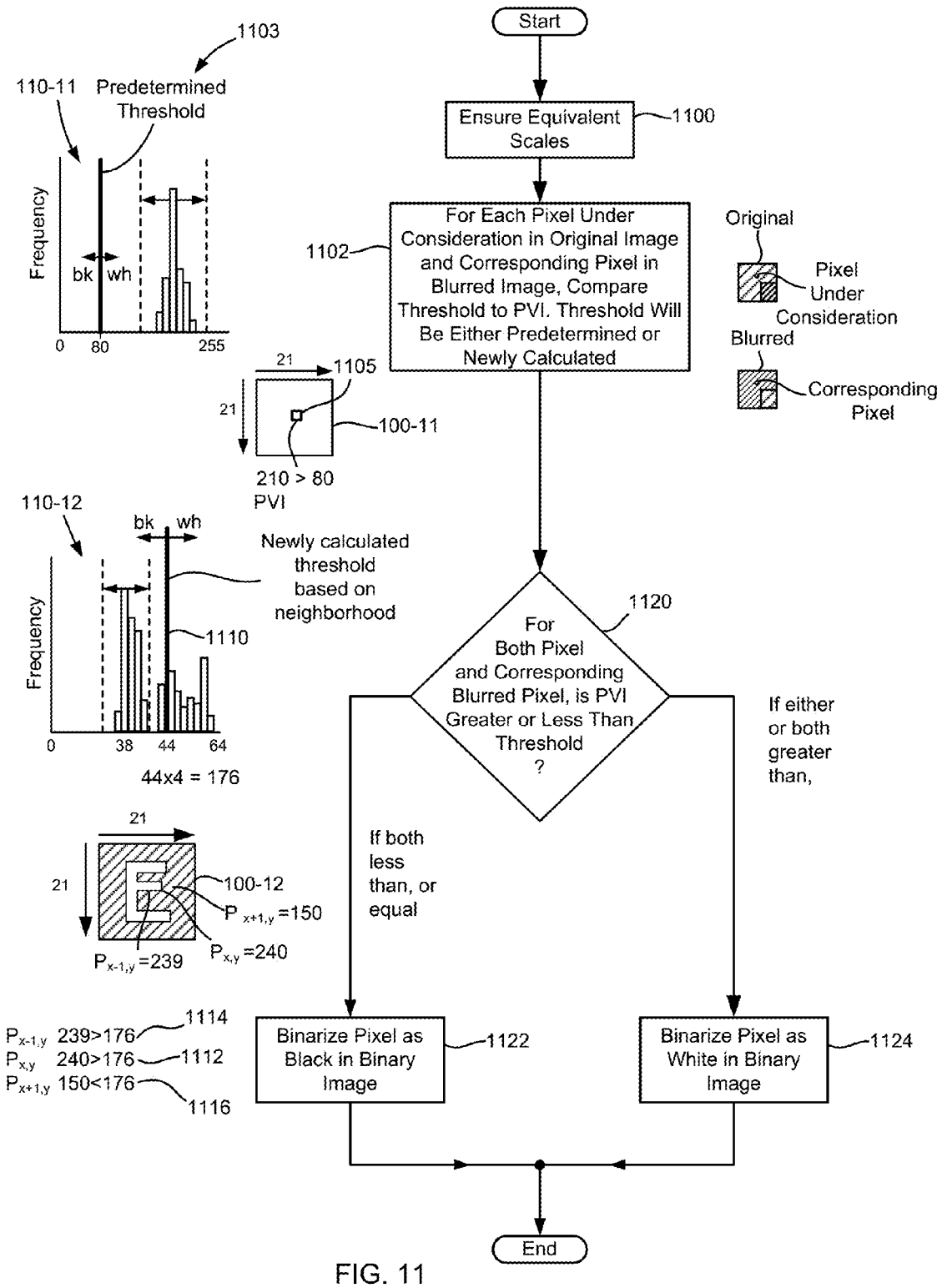
FIG. 11 is a flow chart and diagram for variously applying thresholds to binarize individual, multi-valued pixels of an image.

Alternatively, if the pixel under consideration had calculated for it a unique threshold value based on neighboring pixels in a bounding box, e.g., as calculated from FIG. 10, the pixel value intensity would be now compared to the unique threshold value. By reference to pixel $P_{x,y}$ in a bounding box 100-12 of neighboring pixels, and having a distribution of data 110-12 for the box, a threshold value 1110 of 44 was found to be the pixel value intensity by which pixels would be adjudicated as either white (greater than 44) or black (less than or equal to 44). As $P_{x,y}$ has a pixel value intensity of 240 out of 256 possible intensity values and the threshold has been found in a histogram having only 64 bins, the threshold value 1110 is first converted to a proper scale for comparison. As 64 is one-fourth the value of 256, the threshold value 1110 of 44 is multiplied by four, which is 176 or 44×4. In turn, the pixel value intensity of 240 is compared to 176, 1112. As 240 is greater than 176, the binary value of $P_{x,y}$ becomes white. Similarly, a pixel neighboring $P_{x,y}$, one left, $P_{x-1,y}$, has a pixel value intensity of 239 and becomes white relative to the threshold value of 176 as 239 is also greater than 176 (239>176), 1114. Conversely, a pixel neighboring $P_{x,y}$, one right, $P_{x+1,y}$, has a pixel value intensity of 150 and becomes adjudicated black relative to the threshold value of 176 as 150 is less than or equal to 176 (150≤176), 1116.

Regardless of the pixel being compared to a predetermined or uniquely calculated threshold, and regardless of whether the pixel is found in the original or blurred image, if the pixel under consideration at 1120 is less than or equal to the threshold, and so too is its counterpart pixel in the blurred image less than or equal to its threshold, the pixel becomes set as a black pixel in the binary image, 1122. Else, the pixel becomes set as a white pixel in the binary image, 1124. In other words, both the pixel in the original and blurred images must be binary black relative to the threshold in order for the pixel of the image to be set as black in the binary image. If either or both of them are binary white relative to the threshold, the pixel of the image becomes set to white in the binary image.

Figure 12:
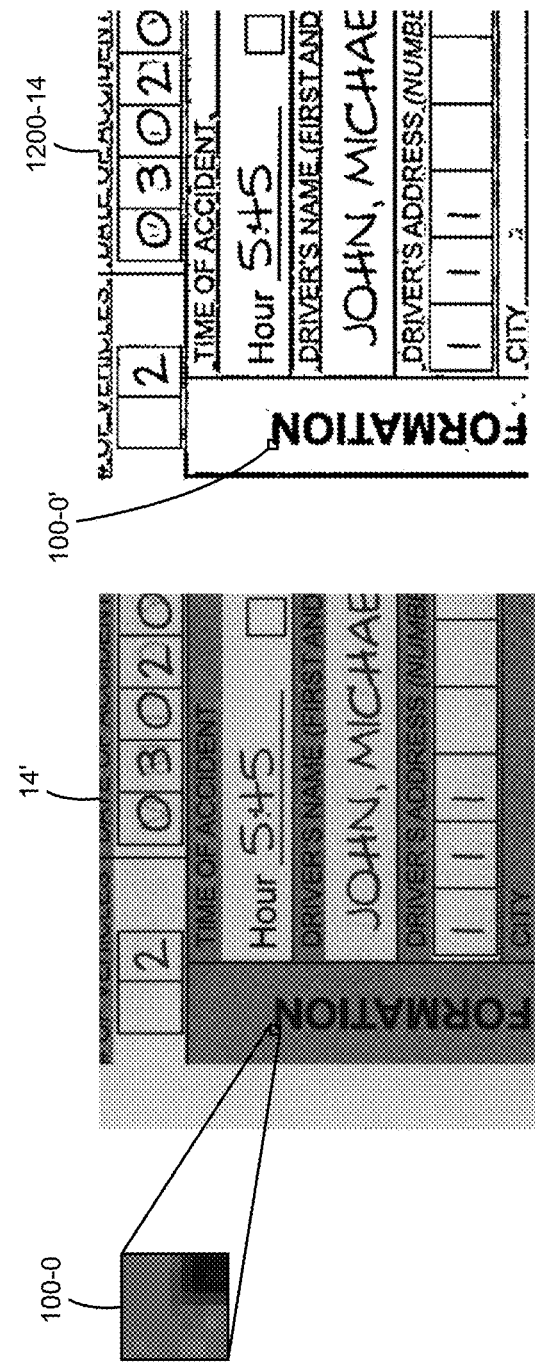
FIG. 12 is a diagrammatic view of the binarization results according to the sample of FIG. 8.
Figure 13:
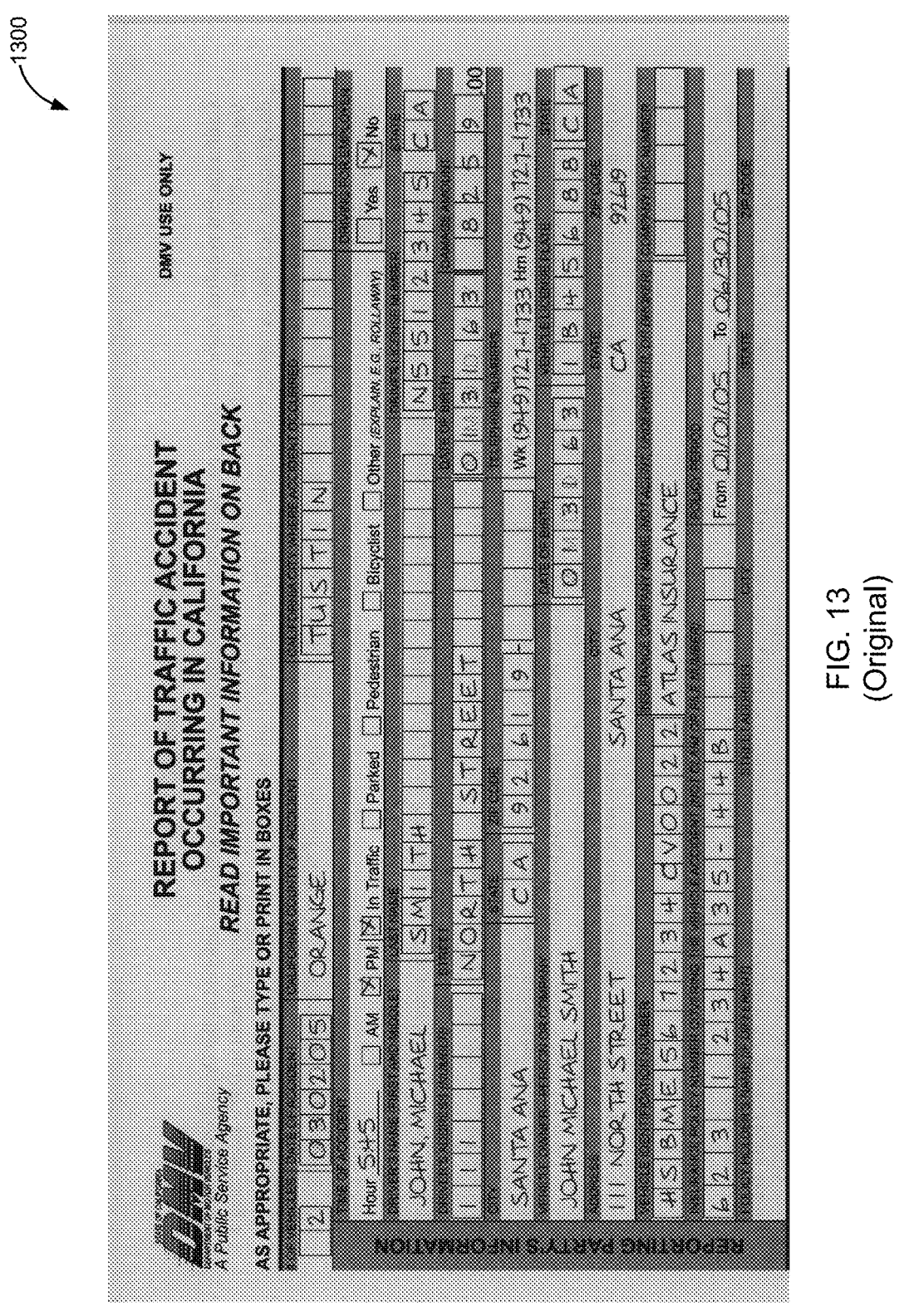
Figure 14:
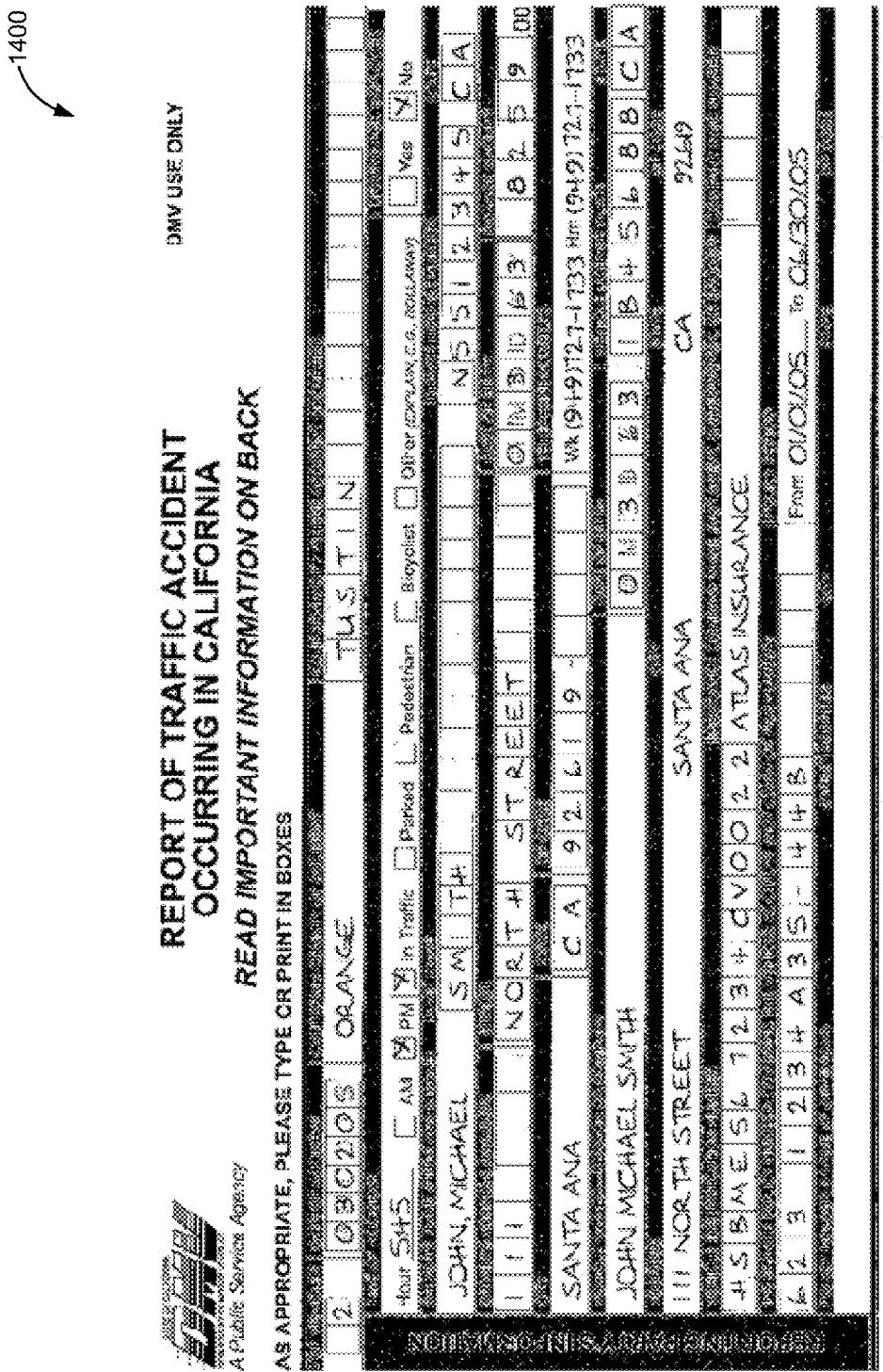
FIG. 14 is a diagrammatic view of the input document of FIG. 13 after poor binarization according to the prior art.
Figure 15:
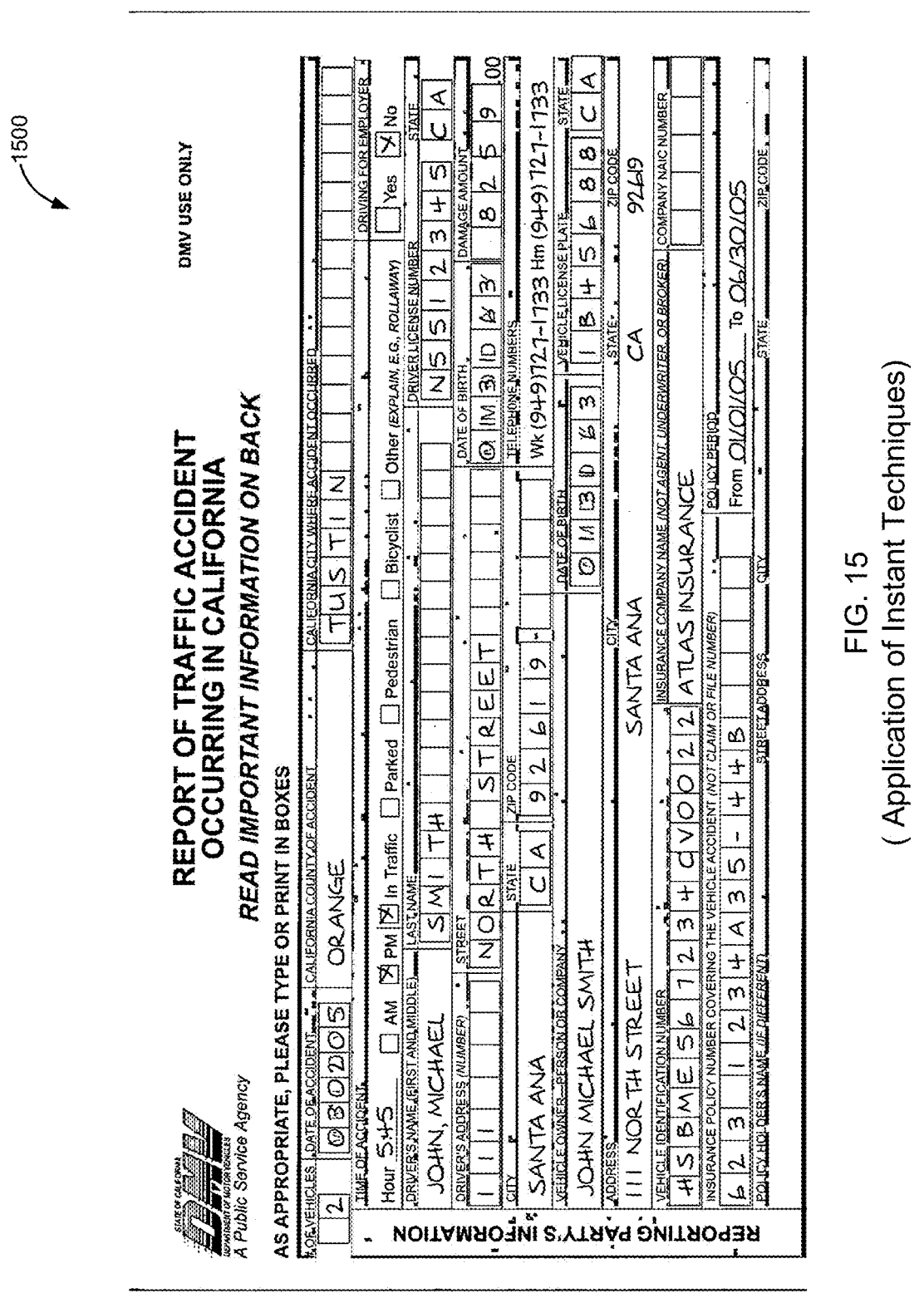

With reference to FIG. 12, the actual results of applying the foregoing techniques to the original image 14' can be seen in the output image 1200-14. It is dramatic to note the bounding box of pixels 100-*o* becoming much more readable and clear at bounding box 100-*o'*. Similarly, the improvement of the present disclosure over the techniques of the prior art can be seen by comparing actual reductions to practice of the invention obtained by the inventors in FIGS. 13-15. In FIG. 13, an original image 1300 is binarized 1400 according to the techniques of the prior art (FIG. 14) and binarized 1500 according to the techniques of the instant disclosure. Markedly, the image binarized at 1500 is clearer and has more readily ascertainable content than the image binarized at 1400.

Comparative Example

Image binarization occurred according to the foregoing using a square bounding box or window size of 11×11 pixels. Histograms were generated by subtracting one column of pixels on the left of a center pixel and adding one column of pixels on the right. Because an 11×11 window was used, it was only necessary to calculate histograms on every third row. The binary image was supplied to an OCR engine and decreased OCR processing time was noted by 33% compared to default binarization used with embedded Exper-OCR brand of Fremont, Calif. In addition, binarization according to the invention increased OCR accuracy for Exper-OCR from 70.6% to 80.7% on fifty-five "challenging" invoices and receipts having traditionally difficult colors, backgrounds, creases, smears, stray marks, etc. It also increased accuracy for embedded Nuance brand OCR from 80.5% to 93.3% on the same set of fifty-five challenging documents which surpasses the OCR accuracy of server-based solutions such as ABBYY brand FineReader.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method for converting an input image to a binary image, the input image having pluralities of pixels defining text and background, comprising:
   blurring the input image with one or more controllers to obtain a blurred image;
   determining thresholds for the pixels of the input image and corresponding pixels in the blurred image by which the pixels and corresponding pixels will be defined as either a black pixel or a white pixel; and with the one or more controllers, setting to black pixels in the binary image those pixels of the input image being defined as said black pixels and having corresponding pixels in the blurred image being defined as said black pixels relative to the thresholds.

2. The method of claim 1, further including grouping together neighboring pixels and devising a distribution of data therefore.

3. The method of claim 2, further including identifying pixels that represent the background in the grouped together neighboring pixels.

4. The method of the claim 3, further including defining an offset of pixels away from the identified pixels that have pixel value intensities similar to pixel value intensities of the identified pixels that represent the background.

5. The method of claim 3, further including identifying a most common color of pixel value intensities in the grouped together neighboring pixels.

6. The method of claim 3, further including separating out remaining pixels from the identified pixels that represent the background.

7. The method of claim 6, further including determining the thresholds relative to the remaining pixels.

8. The method of claim 3, wherein the determining the thresholds further includes applying a predetermined threshold value by which the pixels and corresponding pixels will be defined as either the black pixel or the white pixel if a significant number of pixels do not exist in the distribution of data after the identifying pixels that represent the background in the grouped together neighboring pixels.

9. The method of claim 2, wherein the devising a distribution of data further includes determining a histogram of pixel value intensities relative to a frequency of occurrence in the grouped together neighboring pixels.

10. The method of claim 1, wherein the blurring the input image further includes grouping together small groups of pixels and changing to lighter pixel value intensities of the plurality of pixels of the input image that are relatively dark and changing to darker pixel value intensities of the plurality of pixels of the input image that are relatively light.

11. The method of claim 10, wherein the grouping together small groups of pixels further includes grouping together a 3×3 square of nine pixels.

12. The method of claim 2, wherein the grouping together said neighboring pixels further includes grouping together a 21×21 square of 441 pixels, a threshold being determined for a center pixel of the square.

13. The method of claim 2, wherein the grouping together said neighboring pixels further includes grouping together a 11×11 square of 121 pixels.

14. The method of claim 2, further including grouping together a second group of neighboring pixels and devising a second distribution of data therefore.

15. The method of claim 14, further including identifying pixels that represent the background in the grouped together said second group of neighboring pixels.

16. The method of claim 15, further including separating out remaining pixels from the identified pixels that represent the background in the grouped together said second group of neighboring pixels.

17. The method of claim 16, further including determining another threshold from the remaining pixels of the identified pixels that represent the background in the grouped together said second group of neighboring pixels.

18. The method of claim 14, wherein the grouping together said second group of neighboring pixels further includes advancing a bounding box surrounding a centering pixel in the grouped together neighboring pixels.

19. The method of claim 18, wherein the advancing the bounding box further includes advancing the bounding box across pixels defining a width of the input image and across pixels defining a length of the input image.

20. The method of claim 1, further including comparing pixel value intensities of the pixels of the input image to a pixel value intensity corresponding to a threshold and determining if the pixel value intensities are less than and equal to the pixel value intensity corresponding to the threshold or are greater than.

21. The method of claim 1, further including comparing pixel value intensities of the corresponding pixels of the blurred image to a pixel value intensity corresponding to a threshold and determining if the pixel value intensities of the corresponding pixels are less than and equal to the pixel value intensity corresponding to the threshold or are greater than.

22. The method of claim 1, further including determining as many thresholds as there exist pixels under consideration in the input image and corresponding pixels in the blurred image.

* * * * *